United States Patent

Bolton et al.

Patent Number: 5,258,124
Date of Patent: Nov. 2, 1993

[54] TREATMENT OF CONTAMINATED WASTE WATERS AND GROUNDWATERS WITH PHOTOLYTICALLY GENERATED HYDRATED ELECTRONS

[75] Inventors: James R. Bolton, London; Stephen R. Cater, Willowdale, both of Canada

[73] Assignee: Solarchem Enterprises, Inc., Ontario, Canada

[21] Appl. No.: 801,808

[22] Filed: Dec. 6, 1991

[51] Int. Cl.$^5$ .............................. C02F 1/32; C02F 1/76
[52] U.S. Cl. ..................................... 210/748; 210/749; 210/753; 210/754; 210/757; 210/759; 210/908; 210/909; 210/205; 210/252; 422/24
[58] Field of Search ............... 210/753, 754, 748, 757, 210/749, 908, 909, 759, 760, 747, 252, 205; 422/24, 28

[56] References Cited

U.S. PATENT DOCUMENTS

| | | | |
|---|---|---|---|
| 3,232,869 | 2/1966 | Gard | 210/748 |
| 3,649,493 | 3/1972 | Meiners | 210/754 |
| 4,402,836 | 9/1983 | Fochtman | 210/754 |
| 4,612,124 | 9/1986 | Escrig | 210/759 |
| 4,792,407 | 12/1988 | Zeff | 210/760 |
| 4,849,114 | 7/1989 | Zeff | 210/747 |
| 4,861,484 | 8/1989 | Lichtin | 210/759 |
| 4,956,098 | 9/1990 | Stevens | 210/748 |
| 5,043,080 | 8/1991 | Cater | 210/909 |
| 5,104,550 | 4/1992 | Stevens | 210/909 |

FOREIGN PATENT DOCUMENTS

| | | | |
|---|---|---|---|
| 27278 | 4/1981 | European Pat. Off. | 210/748 |
| 709557 | 1/1980 | U.S.S.R. | 210/759 |

*Primary Examiner*—Thomas M. Lithgow
*Attorney, Agent, or Firm*—Lowe, Price, LeBlanc & Becker

[57] ABSTRACT

A process for treating an aqueous waste water or groundwater containing organic contaminants degradable by hydrated electrons comprises contacting the aqueous waste water or groundwater with an agent which generates hydrated electrons on photolysis. Additionally, the aqueous waste water or groundwater is irradiated with UV light to photolyse the hydrated electron generating agent, thereby generating hydrated electrons to degrade the contaminants. In one embodiment, the aqueous waste water or groundwater is contacted with the hydrated electron generating agent and a reducing agent to recycle the hydrated electron generating agent.

12 Claims, 8 Drawing Sheets

TREATMENT OF CONTAMINATED WASTE WATERS AND GROUNDWATERS WITH PHOTOLYTICALLY GENERATED HYDRATED ELECTRONS

FIELD OF THE INVENTION

This invention relates to methods for treating contaminated waste waters or groundwaters. More particularly, the invention relates to methods for removing organic contaminants from such waters.

BACKGROUND OF THE INVENTION

Photochemical processes have been used for treatment of waste waters and groundwaters contaminated with organic chemicals. Photochemical decontamination processes, however, have almost exclusively been based on oxidative reactions initiated by very reactive radicals such as the oxidizing OH radical or by direct photolytic destruction of the contaminant.

Some organic contaminants such as chlorinated organics are refractory to this treatment and degrade very slowly under such oxidative conditions.

When water is subjected to irradiation with high-energy electrons, both oxidizing (·OH) and reducing radicals are formed [Cooper et al., (1990) in Proceedings of a Symposium on Advanced Oxidation Processes for the Treatment of Contaminated Water and Air, at p.4]. The principal reducing radical produced by radiolysis of water is the aqueous or hydrated electron, $e^-_{aq}$.

It is known that hydrated electrons produced by radiolysis react with a variety of organic compounds, including chloroalkanes and chloroalkenes (J.W.T. Spinks and R.J. Woods, "An Introduction to Radiation Chemistry", 3rd Edition: 1990). The use of gamma or electron irradiation has been suggested for degradation of chlorinated organic pollutants [Getoff (1989) Appl. Radiat. Isot., Volume 40, pp. 585-594; (1991) Radiat. Phys. Chem. Volume 37, pp. 673-680], but was found to be less effective than oxidative photochemical processes. In addition, use of gamma or electron irradiation to generate hydrated electrons requires access to an electron accelerator or comparable elaborate equipment.

It has been known for many years that hydrated electrons can be generated by the ultraviolet (UV) photolysis of a number of negatively charged ions, including iodide, $I^-$. Studies have been made of the reaction of photochemically generated hydrated electrons with chloroalkanes, largely as a tool for determining the nature of the reducing species and the mechanism of the photolysis [Dainton et al., (1965) Proc. Roy Soc. (London) Volume A287, pp. 281-294; Logan et al., (1974) Int. J. Radiat. Phys. Comm., Volume 6, pp. 1—13].

There have been suggestions for employing iodide photolysis and hydrated electron generation as a treatment strategy but these have focused on oxidative hydroxyl radicals as the prime decontamination agent and involved the addition of $N_2O$ to convert the hydrated electrons to the oxidizing hydroxyl species. The fate of the chloroalkanes was not determined in these studies [Logan and Wilmot (1974) Int. J. Radiat. Phys. Chem., Volume 6, p. 1].

The processes suggested in the literature do not provide for the harnessing of the reductive power of the hydrated electron in a convenient photolysis-based decontamination process.

SUMMARY OF THE INVENTION

In accordance with one embodiment of the invention, a process is provided for treating an aqueous waste water or groundwater containing organic contaminants degradable by hydrated electrons comprising contacting the aqueous waste or groundwater with an agent that generates hydrated electrons on photolysis and irradiating the aqueous waste or groundwater with UV light to photolyse the agent, thereby generating hydrated electrons to degrade the contaminants.

DESCRIPTION OF THE DRAWINGS

The invention, as exemplified by preferred embodiments, is described with reference to the drawings in which.

DETAILED DESCRIPTION OF THE INVENTION

Figure 1:
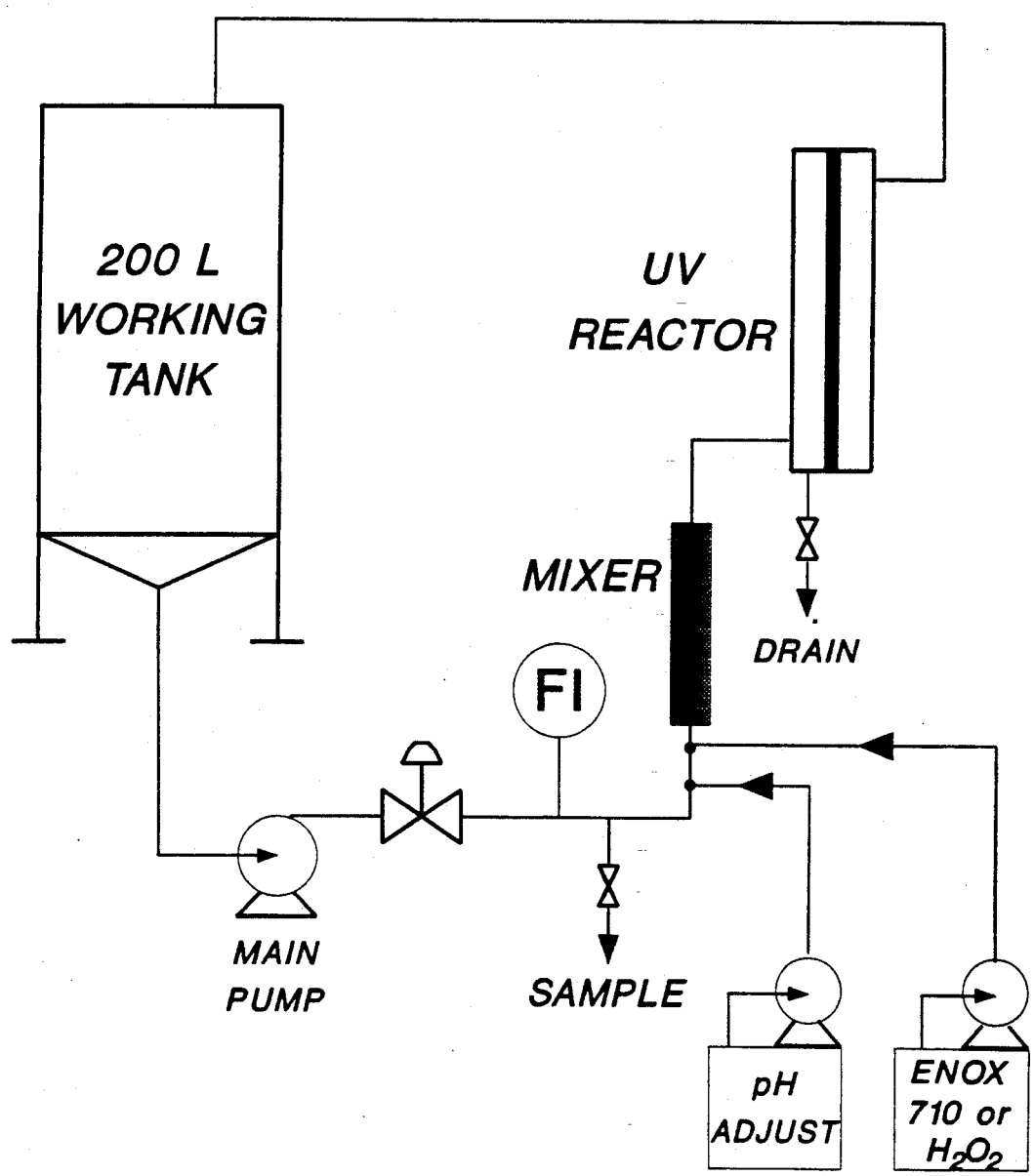
FIG. 1 is a schematic diagram of waste water treatment apparatus.

Aqueous wastes from industrial processes and groundwaters contaminated by spills or leakage from industrial sites frequently contain organic contaminants that have proved rather resistant to oxidative treatment processes. Such resistant contaminants include halogenated organics.

It has been found by the inventors that photolytic generation of hydrated electrons from a variety of agents can be harnessed to destroy such organic contaminants, providing a convenient and effective method of decontaminating wastes and groundwaters.

The process of the invention may be employed to destroy unsubstituted and halogenated aromatic, heterocyclic and aliphatic organic compounds. It is particularly preferred for decontamination of wastes and groundwaters containing chlorinated organic contaminants.

A variety of ions may be used as agents to generate hydrated electrons on photolysis. Iodide, thiosulfate, sulfite, hydroxide and bromide ions, are especially preferred, although others will be known to those skilled in the art. The source of the ions may be any suitable soluble salt.

The wavelength or wavelengths of UV light used for photolysis will depend on the absorption spectrum of the particular ion used, as is known to those skilled in the art. When iodide ions are used, UV light of wavelength or wavelengths in the range of about 180 to about 260 nm is employed. Iodide ions may be supplied by any suitable soluble iodide salt, including KI, NaI, LiI, $MgI_2$ or $CaI_2$. KI is especially preferred.

It is believed that the following reactions occur:

$$I^- \xrightarrow{h\nu} I\cdot + e_{aq}^-$$

$$2I\cdot \longrightarrow I_2$$

At low pH levels, the hydrated electrons react preferentially with hydrogen ions to give hydrogen atoms, reducing the efficiency of the reductive decontamination, so that low pH values should be avoided.

When iodide ions are employed, the process of the invention may be carried out at a pH in the range of about 5-13, a range of about 7 to 11 being preferred, and a range of about 9-11 being especially preferred.

In accordance with one embodiment of the invention, the aqueous waste or groundwater containing halogenated organic contaminants is contacted, at a pH in the range of about 5 to 13, with a source of iodide ions and irradiated with UV light of wavelength in the range about 180-260 nm to destroy the contaminants. It is believed that at pH>8.5, $I_2$ disproportionates to $I^-$ and $IO^-$, thus recycling the iodide ion and increasing the efficiency of the process compared to lower pH values.

Since the photodegradation of pollutants in a system such as this usually follows first-order kinetics, it is convenient to measure the efficiency of the photodegradation by the "electrical energy per order" (EE/O) defined as $$EE/O = \frac{\text{lamp power} (kWh) \times \text{irrad. time (hrs)} \times 3785}{\text{vol. solution}(L) \times \log[\text{init/final}]}$$

The EE/O is the number of kilowatt hours of electricity necessary to reduce the concentration by one order of magnitude in 1000 US gallons (3785L) of treated water. "init" and "final" are the initial and final concentrations over the irradiation time.

Figure 2:
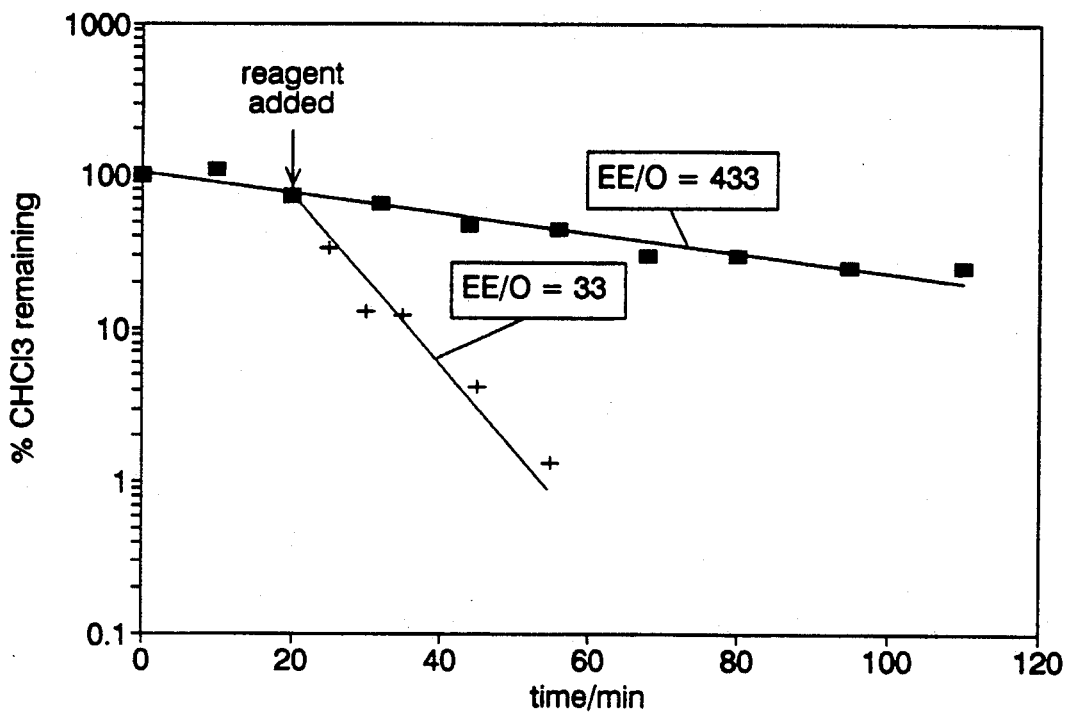
FIG. 2 shows destruction of chloroform over time during treatment with UV light and KI (+) or UV light and $H_2O_2$(■).

As can be seen from FIG. 2, photolysis of iodide and generation of hydrated electrons (+) is more effective (EE/O=33) in destroying chloroform than the oxidative destruction of chloroform using $H_2O_2$ and UV light (■), EE/O=433, under comparable conditions.

The process of the invention is further improved by addition of one or more reducing agents to effect $I^-$ recycling by reducing both $I_2$ and I atoms back to $I^-$. When the hydrated electron generating agent is other than iodide, an appropriate reducing agent is selected which will give recycling of that ion. When iodide ions are employed to generate hydrated electrons, the preferred reducing agents for recycling iodide are thiosulfate or sulfite ions or a mixture of these, depending on the pH at which the process is operated. The reducing agents are supplied as any suitable soluble salt with $Na_2S_2O_3$ and $Na_2SO_3$ being especially preferred.

When a contaminated waste or groundwater containing halogenated organic contaminants is treated at a pH of about 8 or higher, either thiosulfate ions or sulfite ions may be used as reducing agent to give recycling of iodide. The reaction is, however, much slower when thiosulfate is used and sulfite is especially preferred as reducing agent in this pH range. The use of thiosulfate alone as reducing agent is also limited by the concentration of contaminant to be destroyed, as will be described below.

When a contaminated waste or groundwater is treated at a pH below about 8 with sulfite alone as reducing o agent, the process is much slower than at higher pH values but if thiosulfate is added along with sulfite, efficient recycling of iodide is obtained and the process proceeds effectively.

It is thought that at pH values below about 8, sulfite may be present as bisulfite ($HSO_3^-$) which reacts more slowly than $SO_3^{2-}$. Thiosulfate plus bisulfite may also be used as reducing agent in this pH range.

Thiosulfate may be used alone as reducing agent at pH values below about 8, subject to the limitation described below with respect to contaminant concentration. It is preferred, however, to use thiosulfate plus sulfite salts or thiosulfate plus bisulfite salts as reducing agent in this pH range.

It is thought that the following reactions occur when thiosulfate or sulfite are used:

$$2S_2O_3^{2-} + I_2 \rightarrow S_4O_6^{2-} + 2I^-$$
$$2S_2O_3^{2-} + 2I\cdot \rightarrow S_4O_6^{2-} + 2I^-$$

$$H_2O + SO_3^{2-} + I_2 \rightarrow SO_4^{2-} + 2I^- + 2H^+$$

$$H_2O + SO_3^{2-} + 2I\cdot \rightarrow SO_4^{2-} + 2I^- + 2H^+$$

Sulfite and/or bisulfite ions also scavenge oxygen, which otherwise reacts with and removes hydrated electrons, reducing the efficiency of the process.

When sulfite or bisulfite is used with thiosulfate, these may also recycle thiosulfate by the reactions:

$$SO_3^{2-} + S_4O_6^{2-} + H_2O \rightarrow SO_4^{2-} + 2S_2O_3^{2-} + 2H^+$$

$$HSO_3^- + S_4O_6^{2-} + H_2O \rightarrow SO_4^{2-} + 2S_2O_3^{2-} + 3H^+$$

Figure 4:
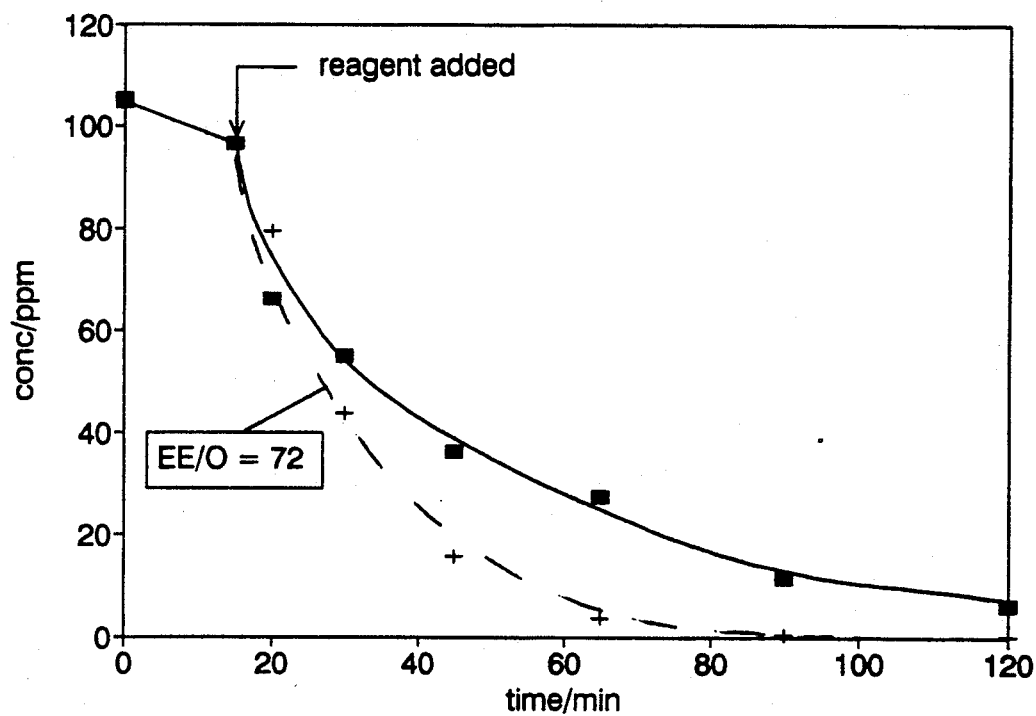
FIG. 4 shows destruction of chloroform (+) by the process of the invention compared with the appearance of $Cl^-$ ion expressed as $[Cl^-]$ at a large (infinite) time minus that at time t (■).

Iodide ions should be present in a concentration sufficient to absorb substantially all of the available UV light. The process of the invention is stoichiometric; for example, when chlorinated organic compounds are destroyed, one hydrogen ion is produced for each chloride atom removed. As seen in FIG. 4, the total amount of Cl in the contaminating chloroform is recovered as $Cl^-$, indicating complete removal of chlorine atoms from the chlorinated organic, even at concentrations as high as 100 ppm.

The concentration of reducing agent required is proportional to the concentration of halogen atoms in the contaminant to be destroyed. If, however, thiosulfate is used as the sole reducing agent, when levels of contaminant greater than about 30 ppm are to be treated, a proportional increase in thiosulfate leads to reduced efficiency as thiosulfate itself absorbs the UV light significantly.

The concentration of thiosulfate should not be larger than that of $I^-$ and if additional reducing power is required for the concentration of contaminant to be destroyed, it is supplied by addition of sulfite.

As indicated above, hydrogen ion production during the process of the invention is proportional to the concentration of chlorinated organic compound being destroyed and a pH no lower than about 5 is desirable to avoid loss of hydrated electrons. For low concentrations of contaminant, there may be sufficient buffering capacity in the system to maintain pH at a desirable level but when higher levels of contaminant have to be treated (above about 20 ppm), the pH of the reaction mixture is preferably maintained at least at pH 5 and more preferably at least at pH 7, by addition of alkali as required. A pH in the range of about 9 to 11 is especially preferred.

In accordance with a preferred embodiment of the invention, the aqueous waste or groundwater containing halogenated organic contaminants is contacted with a source of iodide ions and with a reducing agent or reducing agents effective for recycling the iodide ions and irradiated with UV light of wavelength in the range about 180–260 nm to destroy the contaminants.

In accordance with a further preferred embodiment, the aqueous waste or groundwater is contacted at a pH below about 8 with a source of iodide ions and with thiosulfate and sulfite ions to recycle the iodide ions and irradiated with UV light of wavelength in the range about 180 to 260 nm to destroy the contaminants.

In accordance with an especially preferred embodiment of the invention, the aqueous waste or groundwater containing halogenated organic contaminants is contacted at a pH in the range about 9 to 11 with a source of iodide ions and with sulfite ions to recycle the iodide ions and irradiated with UV light of wavelength in the range about 180 to 260 nm to destroy the contaminants.

The aqueous waste or groundwater may be treated in a batch recirculation mode by the process of the invention in a treatment apparatus such as that shown in FIG. 1 although other possible treatment systems will be known to those skilled in the art. For example, flow through treatment can be performed by mixing the desired reagents with the contaminated water and then feeding the mixture through one or more UV reactors, the number of reactors and the numbers of UV lamps per reactor, and the power of each lamp being selected to give the desired level of treatment of the contaminants.

Many contaminated wastes will contain contaminants such as non-halogenated organics that can be effectively treated by known UV/$H_2O_2$ treatments, as well as the more resistant contaminants such as halogenated organics treatable by the process of the invention. Many of these less resistant contaminants may also be destroyed by the process of the invention. Alternatively, as will be evident to those skilled in the art, a waste or groundwater may be pre-treated by a UV/$H_2O_2$ treatment before being treated by the process of the present invention, with pH adjustment as necessary after the UV/$H_2O_2$ pre-treatment. Alternatively it may be post-treated by UV/$H_2O_2$ after being treated by the process of the present invention.

The process of the invention may be employed to destroy aromatic or aliphatic organic compounds, including halogenated compounds such as haloalkanes, haloalkenes and halobenzenes.

Particularly preferred compounds which may be treated by the process of the invention include chloroform, dichloromethane, dichloroethane, trichloroethane, tetrachloroethane, dichloroethylene, trichloroethylene, fluorotrichloromethane, carbon tetrachloride, hexachloroethane, tetrachloroethylene, 1,2-dichlorobenzene, dichlorotetrafluoroethane, trifluorotrichloroethane and other chlorofluorocarbons.

The following examples are merely illustrative of the process of the invention and the invention is not necessarily limited thereto.

EXAMPLE 1

Treatment was carried out in the reactor of the apparatus of FIG. 1, the reactor having a capacity of 30 L and having a central quartz tube, diameter 4.2 cm, containing a Solarchem 6 kW high-intensity UV lamp, powered by an AC power supply (60 Hz) at 750 V and 8 A. The solution to be treated was pumped through the reactor at ~75 L/min from a 200 L recycle tank.

The recycle tank and reactor of FIG. 1 were charged with chloroform (10 ppm) in tap water, adjusted to pH 9 and the solution was circulated for 30 min. The UV light was switched on for 20 min., after which $H_2O_2$ (300 ppm) was added to the solution and treatment was continued for a total of 120 min. Samples taken at appropriate intervals were analyzed for $CHCl_3$ concentration by extraction into toluene followed by gas chromatography on a Perkin-Elmer Model Sigma 2B equipped with an electron capture detector and a 15 m×0.5 mm internal diameter DB-1 column.

Further samples of chloroform solution (10 ppm) were treated at the same pH as follows:

(a) KI (50 ppm $I^-$) was added 20 min. after UV light switched on;

(b) KI (50 ppm $I^-$) was added 20 min. after UV light switched on, followed by addition after further 20 min. of $H_2O_2$ (300 ppm).

The degradation of chloroform by $H_2O_2$ alone and KI alone are shown in FIG. 2. The results with KI+$H_2O_2$ were virtually the same as those with KI alone and are not shown.

EXAMPLE 2

An aqueous solution of chloroform (10 ppm) was adjusted to pH 6.5 and three portions were treated generally according to the protocol of Example 2 with the following additives:

(i) no additives—UV treatment only;

(ii) KI (50 ppm $I^-$) was added 20 min. after UV light on;

(iii) KI (50 ppm $I^-$) + $Na_2S_2O_3$ (150 ppm $S_2O_3^{2-}$) added 20 min. after UV light on;

(iv) $Na_2S_2O_3$ (150 ppm $S_2O_3^{2-}$) added 20 min. after UV light on.

Figure 3:
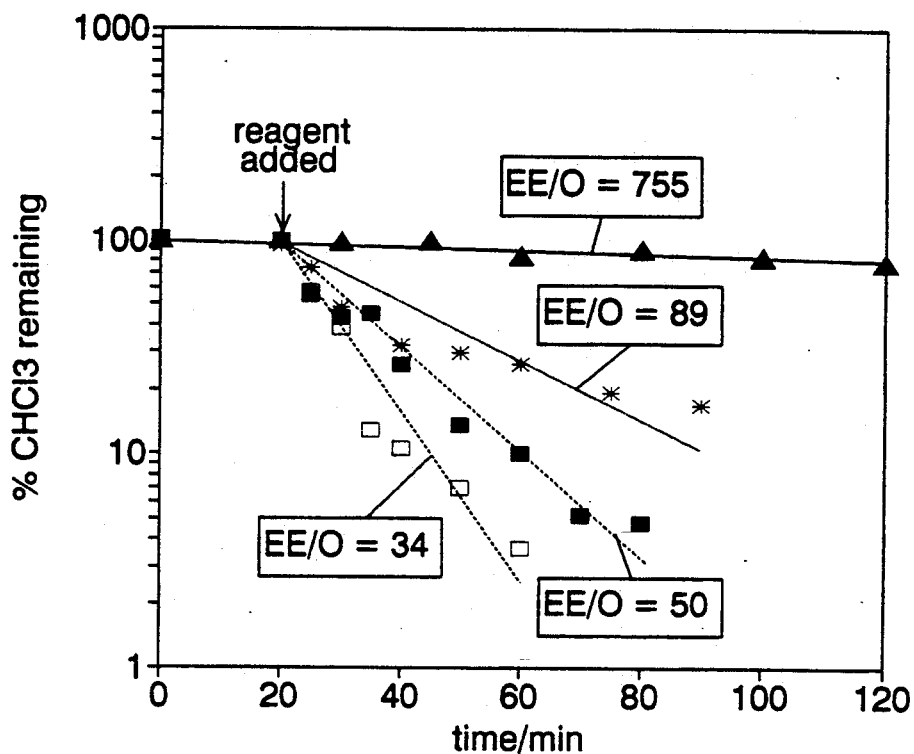
FIG. 3 shows destruction of chloroform over time with the following treatments: No additives (▲); KI(■); KI+$Na_2S_2O_3$ (□) and $Na_2S_2O_3$ (*).

The results are shown in FIG. 3.

EXAMPLE 3

A series of experiments similar to Example 2 were conducted with different concentrations of reagents and pH 7.5. The concentration of $I^-$ was varied in the range $(2-8) \times 10^{-4}$ M and that of $S_2O_3^{2-}$ in the range $(0.5-5) \times 10^{-4}$ M.

The concentrations of KI and $Na_2S_2O_3$ were optimized using a "Sequential Simplex Method" (Jenson & Jeffreys, 1977) triangulation optimization procedure.

At a chloroform concentration of 10 ppm, the optimum concentrations were found to be:

$[KI] = 4.0 \times 10^{-4}$ M (50 ppm $I^-$)

$[Na_2S_2O_3] 1.25 \times 10^{-4}$ M (14 ppm $S_2O_3^{2-}$)

Optimum concentrations for other pH conditions can be similarly determined.

EXAMPLE 4

A chloroform solution (10 ppm) was adjusted to pH 3 and treated with $KI + Na_2S_2O_3$ at the optimum levels found in Example 3. Chloroform degradation under these conditions was very slow and was comparable to degradation by photolysis alone.

EXAMPLE 5

An aqueous solution of chloroform at 100 ppm was treated with $I^-$ (50 ppm) and $S_2O_3^{2-}$ (22 ppm) after 15 min of direct photolysis as in Example 1. The degradation rate was rapid at the beginning but slowed down markedly at the same time as the orange color of $I_2$ was observed. It was also found that the pH had dropped to about 3. The acidification of the solution as well as the depletion of the reducing agent ($S_2O_3^{2-}$) are probably the reasons that the reaction rate slowed down.

A second sample of chloroform solution (100 ppm) was treated with KI (50 ppm $I^-$), $Na_2S_2O_3$ (14 ppm $S_2O_3^{2-}$) and $Na_2SO_3$ (200 ppm $SO_3^{2-}$) after 15 min of direct photolysis. In addition the pH of the solution was maintained at ~7.5 during the treatment by addition of 10% KOH as required.

Generation of $Cl^-$ was followed by analyzing samples by the colormetric method of Florence & Farrar (1971) and the ASTM standard method (ASTM, 1988). The results are shown in FIG. 4. It is significant that the total amount of Cl in the initial $CHCl_3$ eventually appeared as $Cl^-$. In addition it was found that the total amount of base necessary to keep the pH constant was about the same molar amount as the $Cl^-$ produced. Finally we noted that the curve of $([Cl^-]_{inf} - [Cl^-]_t)$ did not follow that of the decay of $[CHCl_3]$. This indicated that intermediates were formed that trapped part of the organic chlorine before they were attacked by the hydrated electrons to release the $Cl^-$. The EE/0 was about 71.

EXAMPLE 6

An aqueous solution of dichloromethane (10 ppm) was treated in the same manner as for Example 2 after adjustment to pH 7.5. The results indicated that dichloromethane was degraded at a rate about 1.5 times slower than for chloroform under the same conditions. The rate of degradation of dichloromethane using the $I^-/S_2O_3^{2-}$ system was comparable to that which would be obtained with the $H_2O_2$ system.

EXAMPLE 7

Figure 5:
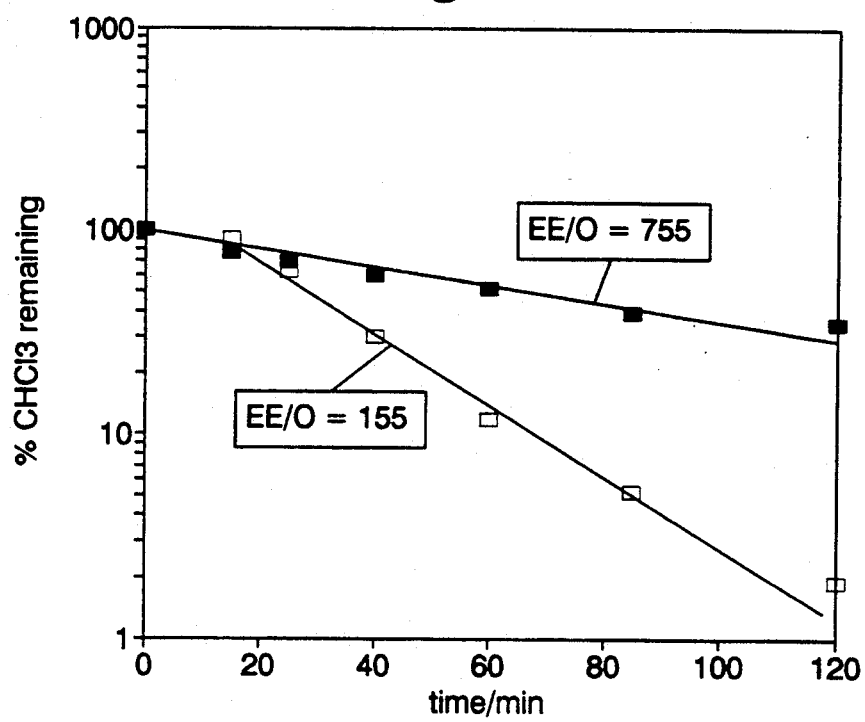
FIG. 5 shows the destruction of chloroform in contaminated ground water by the process of the invention (□) and by UV/$H_2O_2$ (■).

A sample of a contaminated ground water was obtained, containing chloroform (~40 ppm) and trichloroethylene (TCE) (~40 ppm) in 10% salt solution. Samples of this waste water were treated with UV/$H_2O_2$ (500 ppm) and separately with KI (50 ppm $I^-$) and $Na_2S_2O_3$ (55 ppm $S_2O_3^{2-}$) under the same conditions as in Example 2. The groundwater had a pH of 7.5. The destruction of chloroform is shown for the two treatment regimes is shown in FIG. 5. The TCE was degraded at about 10 times the rate of chloroform.

EXAMPLE 8

Figure 6:
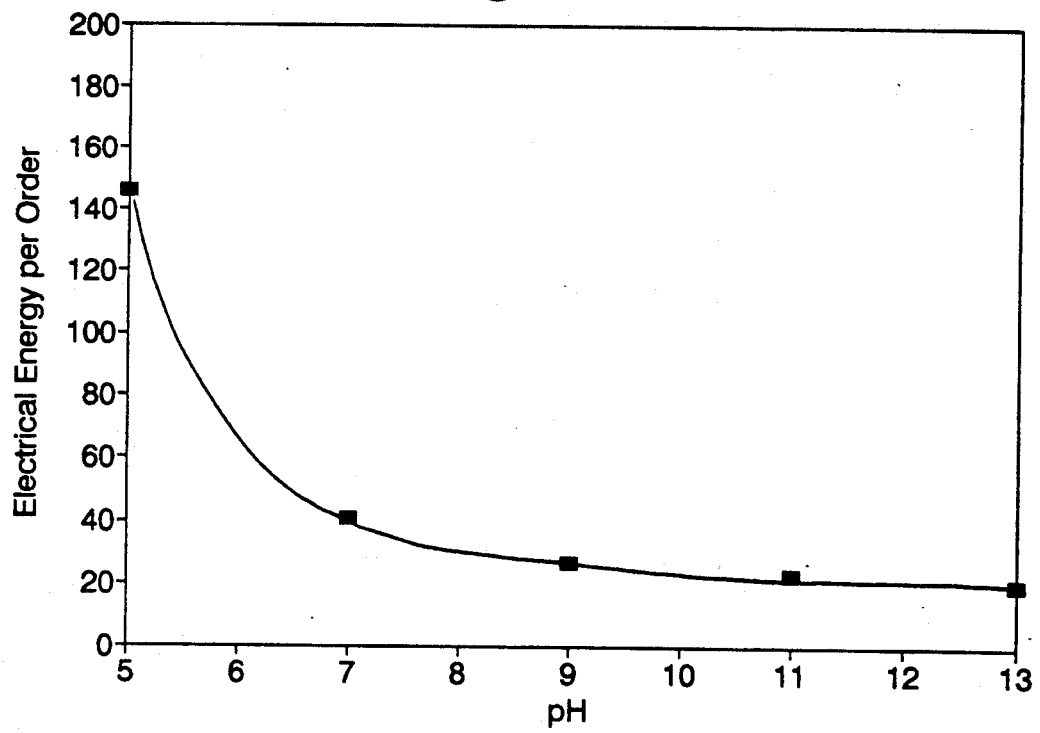
FIG. 6 shows the effect of pH on the process of the invention.

The effect of pH on the destruction of 15 ppm $CHCl_3$ using the $I^-/S_2O_3^{2-}$ system was examined by a procedure similar to Example 2. The results are shown in FIG. 6.

EXAMPLE 9

Figure 7:
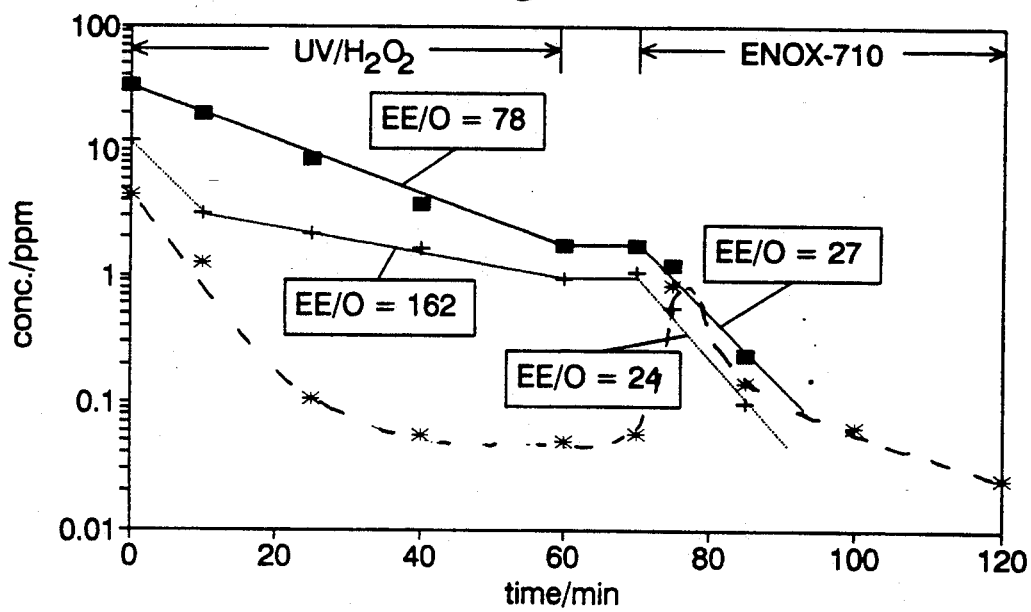
FIG. 7 shows the destruction of dichloromethane-DCM (■), 1,2-dichloroethylene-DCE plus 1,1,1-trichloroethane-TCA (+), and 1,2-dichloroethane (*), treated by the RAYOX TM UV/$H_2O_2$ process for 60 mins, followed by treatment with the process of the invention from 70 min to 120 min.

A polluted groundwater near a chemical plant was treated. The principal contaminants in this water were dichloromethane (DCM) (~35 ppm), dichloroethylene (DCE) (~10 ppm) and 1,1,1,-trichloroethane (TCA) (~6 ppm), plus minor amounts of many other components, such as benzene and toluene. First, a synthetic test solution was prepared containing the above components plus 6 ppm of 1,2-dichloroethane (DCA). This latter component was included because this compound had been detected as an intermediate in some earlier runs with DCM. The treatment strategy involved treatment with the conventional UV/$H_2O_2$ treatment at pH 7 for 60 min, raising the pH to 9 while adding 100 ppm of $Na_2SO_3$ and then at 70 min adding 50 ppm KI plus 50 ppm $Na_2S_2O_3$. This latter mixture will be referred to as ENOX-710. FIG. 7 shows the results for the synthetic test water. The UV/$H_2O_2$ treatment was able to reduce the DCM concentration slowly (EE/O=78), but when the ENOX-710 treatment began at 70 min, the rate speeded up markedly (EE/O-27). DCE and TCA came off at the same point in the GC analysis and so were not detected separately; however, it is known that DCE is removed rapidly by UV/$H_2O_2$ treatment, so the sharp drop in the first 10 min was probably mostly due to the removal of the DCE. The TCA was removed very slowly by UV/$H_2O_2$ (EE/O-162), but on switching to the ENOX-710 treatment the rate increased sharply (EE/O=24). The DCA was removed quickly by the UV/$H_2O_2$ treatment but reached a plateau at ~0.1 ppm and increased when the ENOX-710 treatment began; however, it later was removed.

Figure 8:
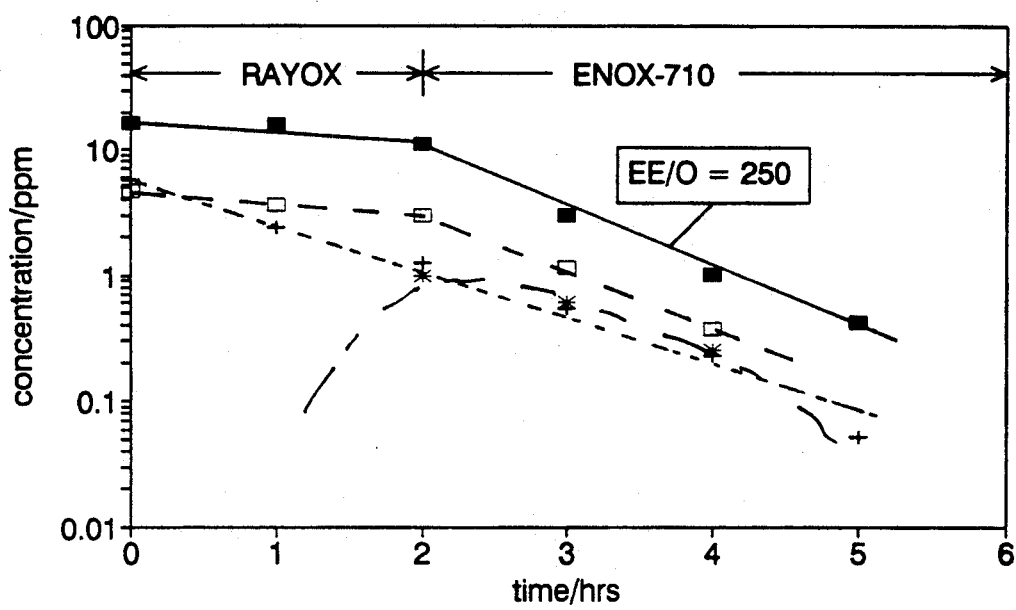
FIG. 8 shows the destruction of contaminants in a polluted groundwater by treatment with UV/$H_2O_2$ for 2 hrs, followed by treatment with the process of the invention for three hours. The contaminants shown are dichloromethane (■), 1,2-dichloroethylene (+), 1,2-dichloroethane (*) and 1,1,1-trichloroethane (□).

The initial tests in the lab were followed by a field test on site with the actual polluted groundwater. FIG. 8 shows the results of the field test. The groundwater contained about ~10 ppm of iron, which is an inhibitor of the ENOX-710 process. The water was first treated with 200 ppm $H_2O_2$ in a holding tank to remove some of the iron. Analysis was performed on site and it was possible to resolve all four major contaminants. It is clear from FIG. 8 that only the DCE was treated effectively by the UV/$H_2O_2$ process. After 2 hours, the pH was raised to 10 with addition of 100 ppm $Na_2S_2O_3$, followed by the ENOX-710 mixture. The removal rates of DCM and TCA increased sharply on switching to the ENOX-710 treatment. Although 1,2-DCA was not present in the o original water, it again appeared as an intermediate but was subsequently removed.

EXAMPLE 10

The procedure of Example 5 was repeated on aqueous solutions of different compounds at pH 10 using iodide concentrations in the range 12.5–50 ppm of iodide and 80–320 ppm of sulfite. The amount of sulfite added was chosen to correspond to the total amount of halide ions produced from each compound tested. The results are summarized in the following Table:

| Compound | Initial ppm | Final ppm | EE/O |
| --- | --- | --- | --- |
| Carbon Tetrachloride | 50 | <0.5 | 17 |
| Chloroform | 50 | <1 | 22 |
| Fluorotrichloromethane | 80 | <0.5 | 26 |
| Dichloromethane | 10 | <0.2 | 33 |

-continued

| Compound | Initial ppm | Final ppm | EE/O |
|---|---|---|---|
| 1,2-Dichlorobenzene | 10 | <0.1 | 33 |

Although the invention has been described in relation to preferred embodiments, the present invention is not limited to features of this embodiment, but includes all variations and modifications within the scope of the claims.

We claim:

1. A process for treating an aqueous waste water or groundwater containing organic contaminants degradable by hydrated electrons, said process comprising contacting the aqueous waste water or groundwater with an agent which generates hydrated electrons on photolysis and a reducing agent to recycle the hydrated electron generating agent, and irradiating the aqueous waste water or groundwater with UV light to photolyse the hydrated electron generating agent, thereby generating hydrated electrons to degrade the contaminants, wherein said hydrated electron generating agent is iodide ions, said UV light has a wavelength or wavelengths in the range of about 180 to about 260 nm and said reducing agent is selected from the group consisting of thiosulfate ions, sulfite ions, both thiosulfite and sulfite ions and both thiosulfate and bisulfite ions.

2. A process in accordance with claim 1 wherein said hydrated electron generating agent is iodide ions, said UV light has a wavelength or wavelengths in the range of about 180 to about 260 nm, said aqueous waste water or groundwater has a pH in the range of about 8 to about 13 and said reducing agent is selected from the group consisting of thiosulfate ions and sulfite ions.

3. A process in accordance with claim 2 wherein said aqueous waste water of groundwater has a pH in the range of about 9 to 11 and said reducing agent is sulfite ions.

4. A process in accordance with claim 1 wherein said hydrated electron generating agent is iodide ions, said UV light has a wavelength or wavelengths in the range of about 180 to about 260 nm, said aqueous waste water or groundwater has a pH above about 5 but lower than about 8 and said reducing agent is selected from the group consisting of thiosulfate ions, both thiosulfate and sulfite ions and both thiosulfate and bisulfite ions.

5. A process in accordance with claim 4 wherein said reducing agent is sulfite ions and thiosulfate ions.

6. A process in accordance with claim 1, wherein the source of iodide ions is a water soluble iodide salt.

7. A process in accordance with claim 1, wherein the source of iodide ions is a salt selected from the group consisting of NaI, KI, LiI, $MgI_2$ and $CaI_2$.

8. A process in accordance with claim 1, wherein the source of iodide ions is KI.

9. A process in accordance with claim 1, wherein the organic contaminants are one or more halogenated organic contaminants.

10. A process in accordance with claim 1, wherein the organic contaminants are one or more halogenated organic compounds selected from the group consisting of halogenated aromatic compounds, halogenated alkanes and halogenated alkenes.

11. A process in accordance with claim 1, wherein the organic contaminants are one or more organic compounds substituted with one or more atoms of bromine, fluorine or chlorine or any combination of said atoms.

12. A process as claimed in claim 1, wherein the halogenated organic compounds are one or more compounds selected from the group consisting of chloroform, dichloromethane, dichloroethane, trichloroethane, tetrachloroethane, dichloroethylene, trichloroethylene, fluorotrichloromethane, carbon tetrachloride, hexachloroethane, tetrachloroethylene, 1,2-dichlorobenzene, dichlorotetrafluoroethane and trifluorotrichloroethane.

* * * * *